Oct. 18, 1955      M. C BEEBE, JR      2,720,749

NOZZLE CLOSURE ASSEMBLY

Filed Jan. 31, 1950      2 Sheets-Sheet 1

*INVENTOR.*
MURRAY C. BEEBE, JR
BY
Frank J. Epstein

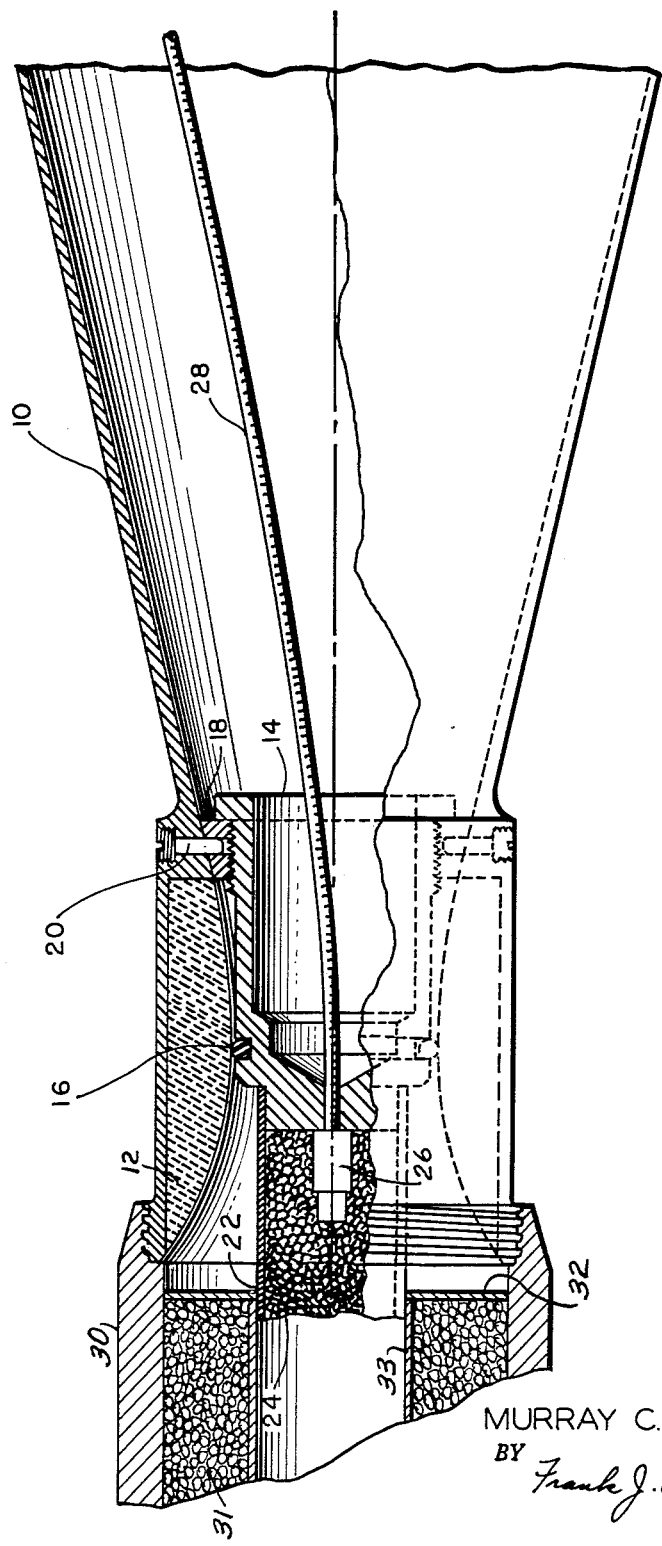

United States Patent Office 2,720,749
Patented Oct. 18, 1955

2,720,749
NOZZLE CLOSURE ASSEMBLY

Murray C. Beebe, Jr., Palos Verdes Estates, Calif., assignor, by mesne assignments, to Hughes Aircraft Company, a corporation of Delaware Application January 31, 1950, Serial No. 141,543

5 Claims. (Cl. 60—35.6)

This invention relates primarily to jet motors of the rocket type which produce reactive thrust forces as a result of high-velocity discharge of propellant gases.

The type of rocket motor with which the present invention is concerned generally comprises a tubular casing or chamber containing a combustible solid propellant material, the casing having at its trailing end an axially aligned DeLaval or Venturi type of discharge nozzle. Large volumes of gases at high pressure and temperature are generated by ignition and burning of the propellant material within the combustion chamber, and the reaction to the high-velocity discharge of these gases through the nozzle constitutes the propulsive thrust developed by the rocket motor.

It has been found desirable in certain applications to shorten the time-period during which complete ignition of the propellent takes place. This may be achieved by increasing the combustion chamber pressure with great rapidity, so that ignition may proceed under the accelerating condition of elevated pressure. This rapid elevation of chamber pressure may be effected by providing a nozzle closure for the rocket motor which is designed to rupture or be cleared from the nozzle at a suitable predetermined pressure. This nozzle closure may take the form of a diaphragm or plug which in turn, may be welded, brazed, soldered, cemented or otherwise similarly secured within the nozzle. The closure structures as have been heretofore employed, however, have in practice evidenced certain operational difficulties, principally the lack of uniformity of motor performance due to inability to provide an accurately predeterminable closure blowout pressure, and thrust misalignment caused by interfering vestigial portions or incomplete ejection of the diaphragm or plug closures.

It is therefore the immediate object of the present invention to provide an improved nozzle closure arrangement for a rocket motor which will be discharged or cleared from the nozzle at an accurately predetermined combustion chamber pressure and hence minimize the ignition period thereof.

The foregoing and other objects and features of the invention will be better understood from the following description taken in conjunction with the accompanying drawings in which:

Fig. 3 illustrates a nozzle closure arrangement in accordance with the present invention.

The solid propellants commonly employed in rocket motors of the type here contemplated burn at rates largely dependent upon the chamber pressure. In general, the relation between the burning rate $r$ and the chamber pressure P may be expressed by the equation $r = AP^n$ in which A and $n$ are empirically-determined constants which are characteristic of the specific propellant employed. These constants for a typical propellant are such that the linear burning rate may vary from one inch per second, at a chamber pressure of 1500 pounds per square inch, to one-fortieth of that value at sea level atmospheric pressure. It is therefore apparent that the ignition time characteristic of a propellant may be significantly affected by the motor chamber pressure.

Figure 1:
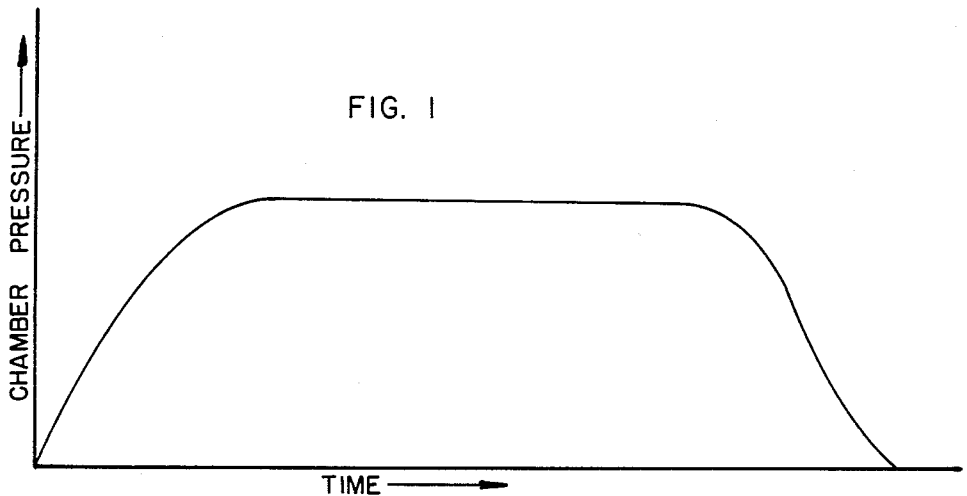
Figs. 1 and 2 are graphs of pressure-time characteristics of rocket motors.

Referring now to the Fig. 1 graph, the chamber pressure versus time curve there shown is characteristic of a rocket motor utilizing a solid propellant and having its nozzle unrestricted by any closure device. The method here and generally utilized to initiate combustion of the propellant is to burn in close proximity thereto a small quantity of more readily ignitible material such as ordinary black gunpowder. As burning of the propellant progresses and increases the chamber pressure, both the propellant burning rate and the combustion chamber pressure increase, as a result of a cumulative or building-up action, to an equilibrium level at which the rate of evolution of gases resulting from propellant combustion is equal to the rate of gas efflux from the motor nozzle. The time taken for the chamber pressure to build up is termed ignition lag, and is defined as the time interval measured from the instant at which the igniter charge is fired to the instant at which the equilibrium pressure and rated thrust corresponding thereto are developed.

As already indicated, the ignition lag may be considerably reduced by use of a frangible or ejectable nozzle closure. While the evolution of gases initiated by firing and burning of the igniter charge and of the propellant material is accompanied by an increase in chamber pressure, as appears from a consideration of Fig. 1, it has been found that, in the open nozzle type of rocket motor, the igniter material itself contributes very little to the pressure increase and pressure increase rate. Under the conditions of operation, however, in which the nozzle passage is blocked during pressure build-up, quite a large proportion of the pressure rise is attributable to burning of the ignition powder, and the rate of pressure rise is correspondingly increased. Certain other difficulties normally arise, however, for while closures heretofore utilized are intended to rupture or eject at a predetermined pressure in order to secure optimum rocket motor performance, test experience has indicated wide departures from predicted closure blowout pressures. These earlier closures are thus defective from standpoints already mentioned and are further deficient because of resultant pressure peaks or delayed ignition as indicated by the characteristic curves shown at 4 and 6, respectively, in Fig. 2.

Figure 2:
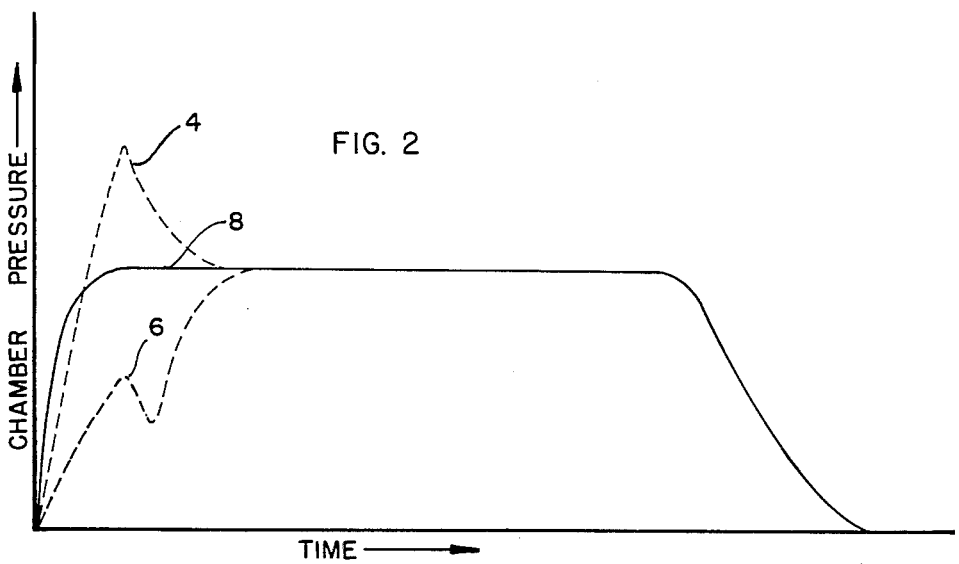

In accordance with the present invention, the rocket motor includes a nozzle closure device which engages the throat portion of the nozzle by means of a gasket and shear pins. Since the force necessary for shearing the pins is rather accurately predeterminable, an improved characteristic of chamber pressure versus time as indicated at 8 in Fig. 2 is readily attainable.

Fig. 3 illustrates a rocket motor exhaust nozzle 10 threadedly attached to a cylindrical casing 30 having a combustion chamber filled with propellant material 31. A disc 32 and a cylindrical sleeve 33 constructed of readily combustible material confine the propellent material 31 within the combustion chamber. Exhaust nozzle 10 is provided with a graphitic liner 12 having a Venturi orifice axially aligned with and forming a communicating throat chamber between the flared outlet portion and the inlet portion of the nozzle.

A cup-shaped plug 14 and a shear ring 18 form an ejectable closure member which, when combined with an obturator 16 and shear pins 20, provide means for closing nozzle 10. As illustrated, the outer surface of shear ring 18 is shaped to correspond to the mating portion of the inner surface of nozzle 10. Shear pins 20 passing through the wall of the nozzle 10 into the body of shear ring 18 intersect the mating surfaces of the nozzle and the ring for holding the ring in the nozzle until the pins are sheared in a manner to be later described. For convenience and safety in assembly, ring 18 is provided with internal threads to receive the externally threaded outer end of plug 14. The inner end of plug 14 extending beyond the narrow portion of the Venturi orifice of liner 12 is provided with an annular recess axially located on the plug to correspond with the axial location of the narrow portion of the orifice. Positioned in the recess around the plug, obturator 16, responding to fluid pressure from within the combustion chamber, seals the space between the plug and the narrow portion of the orifice to permit the buildup of fluid pressure within the combustion chamber.

A canister 22 containing igniter material 24 and a fuse 26, embedded in the igniter material, is supported on the inner end of plug 14 and positioned within cylindrical sleeve 33. Fuse 26 may be energized by an electrical current applied thereto through an igniter cable 28 extending through and sealed in the inner end wall of plug 14.

Energizing fuse 26 fires igniter material 24 which initiates a blast of heat that is communicated through the combustible material of sleeve 33. Due to the nozzle closure, the pressure produced by the burning igniter material 24 promotes an early and complete ignition of propellent material 31 resulting in a rapid rise of pressure in the combustion chamber. When the force exerted by this pressure against the inner end wall of plug 14 exceeds the combined shearing strength of shear pins 20 at the mating surfaces of nozzle 10 and shear ring 18, the pins 20 shear and the ejectable closure member is forcibly expelled, whereupon the rocket motor begins its operation at optimum efficiency.

It is to be noted that plug 14 can move outwardly a considerable distance before obturator 16 reaches a position in the orifice where it is no longer effective to seal the space between the plug and the orifice. This condition insures the complete shear of all pins before gas pressure can exhaust through the nozzle.

From the foregoing description, it can be seen that a composite unit is formed when canister 22, with its igniter material 24 and fuse 26, is attached to plug 14, as shown. This construction presents important advantages from the standpoint of convenience and safety, because the assembled unit may be withheld from the rocket motor until just prior to the connection of igniter cable 28 to any well known means, not shown, for selectively supplying electrical energy to fuse 26 at the desired moment. Moreover, it is evident that the present invention may have parallel and further application to liquid propellant or other types of reaction motors, and to any other device or structure which may require a closure ejectable at an accurately predeterminable pressure. It will also be obvious to those skilled in the arts to which the invention appertains that various changes may be made in the detailed construction and arrangement of parts without departing from the spirit and substance of the invention, the scope of which is defined by the appended claims.

What is claimed is:

1. A reaction propulsion device comprising: a housing having a combustion chamber; a combustible charge positioned in said chamber for generating a large volume of gas when ignited; a nozzle secured to said housing, said nozzle having an orifice communicating with said chamber; a closure member having a middle portion and first and second end portions, said member being positioned in said orifice, said first end portion being in proximity with the combustible charge in said chamber; obturating means positioned between the middle portion of said closure member and said nozzle to seal said orifice; igniter means mechanically coupled to the first end portion of said closure member for igniting said combustible charge; and a plurality of shear pins, each of said pins mechanically coupling said second end portion of said closure member to said nozzle, said shear pins being simultaneously shearable in response to the force applied to said closure member by the gas pressure produced by the ignition of said combustible charge to release said closure member.

2. In a reaction propulsion device having a combustion chamber containing combustive material for producing propellent gases, and a jet producing nozzle adapted to control the beginning of discharge of these propellent gases, said nozzle comprising: a body member having an inlet portion connected to the combustion chamber, an outlet portion, and a communicating Venturi orifice between the inlet and outlet portions; and ejectable closure and ignition means adapted to initiate combustion of the combustive material and to prevent the combustion gases produced thereby from discharging through the nozzle until the combustion gases have attained a preselected propellent gas pressure, said closure means including a plug having an annular recess, shearable means having a preselected shearing strength associated with said plug and said nozzle outlet portion in plug-supporting relationship such that the annular recess of the plug is positioned within the constricted region of said Venturi orifice, and an obturating element disposed within the annular recess of said plug for effecting closure of the nozzle with respect to combustion gases in the combustion chamber until the pressure of such gases coacting with said plug provides a force exceeding the shearing strength of the shearable means, said obturating element being characterized by its ability to respond to gas pressure developed in the combustion chamber so as to seal all space between said plug and the wall of the Venturi constricted region.

3. The nozzle defined in claim 2 in which the nozzle housing is characterized by a liner of carbonaceous material defining the communicating orifice between the inlet and outlet portions.

4. The nozzle defined in claim 2 in which the plug of said ejectable closure is provided with electro-responsive means for initiating combustion of the combustive material; and in which the shearable means associated with the nozzle outlet portion and said plug is characterized by an annular element shearably attached to said nozzle outlet portion and threadedly connected to said plug, said threaded connection permitting the plug with its electro-responsive means to be assembled with the nozzle after the nozzle has been connected to the combustion chamber.

5. The nozzle defined in claim 4 in which the electro-responsive means is characterized by igniter material secured to one end of the plug and adapted for insertion through the nozzle into the combustion chamber; and by an electrically responsive fuse embedded in the igniter material to provide ignition for said igniter material.

References Cited in the file of this patent

UNITED STATES PATENTS

| 2,457,839 | Skinner | Jan. 4, 1949 |
| 2,487,104 | Cooper | Nov. 8, 1949 |
| 2,502,458 | Hickman | Apr. 4, 1950 |
| 2,589,144 | Russell et al. | Mar. 11, 1952 |

FOREIGN PATENTS

| 14,000 | Great Britain | June 24, 1896 |
| 599,275 | Great Britain | Mar. 9, 1948 |
| 305,160 | Germany | Mar. 3, 1920 |